United States Patent [19]

Nair et al.

[11] Patent Number: 5,511,415
[45] Date of Patent: Apr. 30, 1996

[54] GAS FLOW AND TEMPERATURE PROBE AND GAS FLOW AND TEMPERATURE MONITOR SYSTEM INCLUDING ONE OR MORE SUCH PROBES

[75] Inventors: Rajesh M. Nair, Nashua, N.H.; Vivek Mansingh, Santa Clara, Calif.; Raouf A. Ismail, Concord, Mass.

[73] Assignee: Cambridge Aeroflow, Inc., Shirley, Mass.

[21] Appl. No.: 182,654

[22] Filed: Jan. 18, 1994

[51] Int. Cl.[6] .................................................. G01F 1/68
[52] U.S. Cl. ............................... 73/204.11; 374/142
[58] Field of Search ........................... 73/204.11, 204.19, 73/204.22, 861.65, 861.66; 374/142, 40, 41

[56] References Cited

U.S. PATENT DOCUMENTS

| | | | |
|---|---|---|---|
| 3,595,079 | 7/1971 | Grahn | 73/204.22 |
| 3,945,252 | 3/1976 | Fiore | 73/204.19 |
| 4,503,707 | 3/1985 | Rosa et al. | 374/142 |
| 4,537,068 | 8/1985 | Wrobel et al. | 73/204.22 |
| 4,548,516 | 10/1985 | Helenowski | 73/204.11 |
| 4,972,708 | 11/1990 | Wiegleb et al. | 73/204.22 |
| 5,201,217 | 4/1993 | Wachi | 73/204.19 |
| 5,226,729 | 7/1993 | Alford | 73/204.22 |

Primary Examiner—Richard Chilcot
Assistant Examiner—Harshad Patel
Attorney, Agent, or Firm—Iandiorio & Teska

[57] ABSTRACT

A gas flow temperature probe includes a sensor device for sensing the ambient gas cooling rate and temperature; a prenormalizer circuit responsive to and remote from the sensor device for detecting gas cooling rate and temperature signals from the sensor device and for providing calibration data unique to the probe for normalizing the detected gas cooling rate and temperature to generate a normalized gas flow and temperature sensed by the probe; and an elongated flexible cable interconnecting the sensor device and the prenormalizer circuit for transmitting the ambient gas cooling rate and temperature signals from the sensor device to the prenormalizer circuit; a gas flow temperature monitor circuit includes a multiplexer circuit for real time sampling of a number of probes; a scheduler circuit for defining the sampling rate; and a normalizer circuit for combining the gas cooling rate and temperature signals and the calibration data from the prenormalizer circuit for each probe and generating normalized gas flow and temperature sensed by each probe.

6 Claims, 2 Drawing Sheets

GAS FLOW AND TEMPERATURE PROBE AND GAS FLOW AND TEMPERATURE MONITOR SYSTEM INCLUDING ONE OR MORE SUCH PROBES

FIELD OF INVENTION

This invention relates to an improved gas flow and temperature probe and an improved multipoint gas flow and temperature sensing system utilizing a plurality of such probes to measure gas cooling rate, temperature, and ultimately gas flow and linear gas velocity.

BACKGROUND OF INVENTION

To study or characterize a thermal environment the gas flow and temperature measurements need to be taken at several locations virtually simultaneously. For example, to characterize or thermally map an electronic system the gas (typically air) velocity and temperature measurements are required at different locations in the system (i.e., at different locations over the printed circuit board). This has to be done to make sure that the components are getting needed airflow so that they can get cooled to the required temperature.

Presently such study is done using a single probe. To make the measurements, holes are drilled in the prototype or system cabinet, the probe is inserted through the holes and the measurements are taken at the desired locations. If the shape of the equipment is complicated, one may have to drill holes through several layers of the boards to take the necessary measurements. The probe is introduced at a location, measurement is made and moved to the next location of interest. This procedure has several flaws.

The airflow and temperature in a thermal environment are seldom steady. At best they change about a mean point in a steady state. Upon measuring these parameters one acquires only a single-point-single instant-measurement. The flow or temperature at different locations simultaneously is hard to achieve unless several individual instruments are used together and their readings registered at the same time such that a snap shot of the whole environment is available at any time. This facilitates the study of effects of changes at one location on others.

A standard single probe presently available has a telescopic body with the probe at the tip. Introduction of this probe causes the flow field to change because of the physical size and shape of the probe disturbs the airflow. Also this probe requires a straight line access to the location of measurement due to the rigid body of the probe. This restricts the measurability of several locations in an environment. For example, a cabinet with several electronic boards has little space for a straight probe to access the location on a board between two devices.

With the typical single probe, it is difficult to determine the exact location of measurements inside a system due to the probe's limited flexibility. It is impossible to exactly determine at which point a measurement is taken. These measurement points may vary due to the skill level of the individual performing the test.

Using a single probe technique is extremely time consuming and tedious. For a typical measurement, the probe has to be moved to several locations to make a sufficient number of readings. Each location needs to be measured twice, once each for air flow and temperature. This process is repetitive and expensive. These individual probes are quite costly, making a multiprobe system prohibitively expensive.

In addition, the individual probes must be carefully fabricated using expensive, high-precision components or elaborate calibrating techniques to insure that each of the probes presents the same form of input to the signal processor host and can be interchanged without special adjustment.

SUMMARY OF INVENTION

It is therefore an object of this invention to provide an improved gas flow and temperature probe and an improved gas flow and temperature monitor system using such probes.

It is a further object of this invention to provide such an improved gas flow and temperature probe which facilitates easy access to locations on and between electronic circuit boards and components.

It is a further object of this invention to provide such a gas flow and temperature probe which produces little or no disturbance of the gas flow to be measured.

It is a further object of this invention to provide such a gas flow and temperature probe which is easily normalized for complete ease of interchangeability.

It is a further object of this invention to provide such a gas flow and temperature monitor system which measures flow and temperature at a number of different locations virtually simultaneously.

The invention results from the realization that a truly non-intrusive, interchangeable gas flow and temperature probe which facilitates easy access to even difficult locations can be achieved using a small sensor connected over a long, flexible, small cross-section area cable to a remote but in-line prenormalizing circuit which provides the sensed cooling rate temperature and rate signals along with calibration data characterizing the response of the particular probe sensor and circuitry to a normalizing circuit which standardizes the output of each probe.

This invention features a gas flow temperature probe including sensor means for sensing the ambient gas cooling rate and temperature and a prenormalizer circuit responsive to and remote from the sensor means for detecting gas cooling rate and temperature signals from the sensor means and for providing calibration data unique to the probe for normalizing the detected gas cooling rate and temperature to generate a normalized gas flow and temperature sensed by the probe. Elongated flexible cable means interconnects the sensor means and the prenormalizer circuit for transmitting the ambient gas cooling rate and temperature signals from the sensor means to the prenormalizer circuit.

In a preferred embodiment the sensor means may include a cooling rate sensor and a temperature sensor. The cable may have a cross-sectional area of less than approximately 0.03 in$^2$. The cable may be flat and may be approximately 0.1 inch wide and 0.025 inch thick. The sensor means may be less than one inch long and 0.5 inch wide and 0.01 inch thick. The sensor means may be approximately 0.5 inch long, 0.2 inch wide and 0.03 inch thick. The gas whose cooling rate and temperature is being sensed may be air. The prenormalizer circuit may be disposed in line with the cable means and may further include an output connector and an output cable interconnecting the output connector and the prenormalizer circuit.

The invention also features a multiplexer gas flow and temperature sensing system which includes a plurality of gas flow and temperature probes each having sensor means for sensing the ambient gas temperature and cooling rate and a prenormalizer circuit responsive to and remote from the sensor means for detecting gas cooling rate and temperature signals from the sensor means and for providing calibration data unique to the probe for normalizing the detected gas cooling rate and temperature to generate a normalized gas flow and temperature sensed by the probe. An elongated flexible cable means interconnects the sensor means and the prenormalizer circuit for transmitting the ambient gas cooling rate and temperature signals from the sensor means to the prenormalizer circuit. A gas flow and temperature monitor circuit includes a multiplexer circuit for real time sampling of the probes, a scheduler circuit for defining the sampling rate, and a normalizer circuit for combining the gas cooling rate and temperature signals and the calibration data from the prenormalizer circuit for each probe for generating the normalized gas flow and temperature sensed by each probe.

In a preferred embodiment the gas flow and temperature monitor may include a gas density sensor and the normalizer circuit may further include means for calculating the linear gas velocity from the gas flow and the sensed density.

DISCLOSURE OF PREFERRED EMBODIMENT

Other objects, features and advantages will occur to those skilled in the art from the following description of a preferred embodiment and the accompanying drawings, in which.

Figure 1:
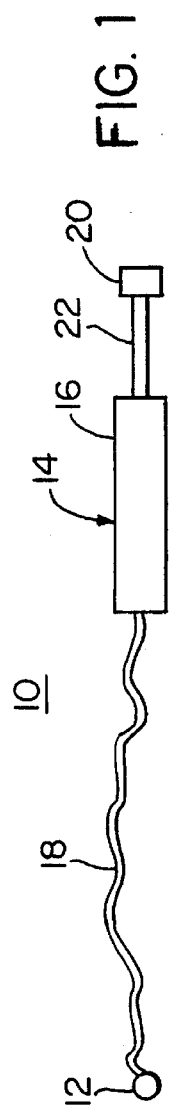
FIG. 1 is a side elevational schematic view of a gas flow and temperature probe according to this invention.

This invention may be accomplished with a gas flow and temperature probe that includes a sensor means for sensing the ambient gas cooling rate and temperature. The ambient gas may be and typically is air in electronic environments. The sensor is made small with a low profile so that it is virtually non-invasive or non-intrusive with respect to the air flow in which it is located and measures. The sensor means may include a cooling rate sensor such as a thermistor and a separate temperature sensor, or it may include a single element which is alternately switched back and forth to perform each of those functions selectively. Typically the sensor is less than an inch long, a half inch wide, and one tenth of an inch thick. In one particular embodiment the entire sensor is but one half inch long, two tenths of an inch wide, and three hundredths of an inch thick.

A prenormalizer circuit responsive to and remote from the sensor device detects the gas temperature and cooling rate signals from the sensor device and provides calibration data unique to the probe for normalizing the detected gas cooling rate and temperature from which subsequently can be generated a normalized gas flow and temperature as sensed by the probe. The prenormalizer circuit receives the signals from the sensor device and converts them to an electrical signal which is supplied along with the calibration data to a normalizer circuit in a gas flow and temperature monitor. The calibration data is typically stored in the non-volatile memory and is placed there by empirically exposing the sensor means to known flow rates and recording the velocity and temperature at three different known flow rates to obtain data for three simultaneous equations that can be solved to obtain the three constants $K_0$, $K_1$ and $K_2$ which are stored as the calibration data in the prenormalizer circuit associated with each probe.

There is an elongated flexible cable which interconnects the sensor device and the prenormalizer circuit for transmitting the ambient gas cooling rate and temperature signals from the sensor means to the prenormalizer circuit. The cable typically has a cross-sectional area of less than 0.03 in$^2$, but may be larger or smaller, provided only that it has minimal effect on the air flow in which it resides. In one case the cable means may be a conventional flat Teflon cable approximately 0.1 inch wide and 0.025 inch thick.

A complete multipoint gas flow and temperature sensing system may be constructed using a plurality of such probes and a gas flow and temperature monitor circuit which includes a multiplexer circuit for real time sampling of the pulses. The multiplexer sampling time is so fast compared to the time scale of the air flow and temperature that the multipoint sensing is accomplished essentially simultaneously. There is a scheduler circuit for defining the sampling rate and a normalizer circuit for combining the gas cooling rate and temperature signals and the calibration data from the prenormalizer circuit for each probe to generate the normalized gas flow and temperature sensed by each probe. The gas flow and temperature monitor may include a gas density sensor and the normalizer circuit may include means for calculating the linear gas velocity from the gas flow and the gas density.

The cable may be as long as six feet or longer and the prenormalizer circuit is disposed in line with the cable and may be housed in a cylinder three inches or less long and approximately one half inch in diameter. The end of the prenormalizer circuit opposite the sensor means may use the same type of cable or another conventional cable with a pin connector at its distal end for interconnection with the gas flow and temperature monitor circuit.

There is shown in FIG. 1 a gas flow and temperature probe 10 according to this invention including a sensor device 12 interconnected by means of an elongated flexible cable 18 with a prenormalizer circuit 14 enclosed in cylindrical capsule 16. The output from prenormalizer circuit 14 is interconnected with a conventional pin connector 20 by means of a cable 22 which may be similar to cable 18 but may be any kind of conventional cable as well. Such a device 12 is made small so that it may be easily placed at any desired location on the electronic equipment or other equipment and has a generally low profile so that there is little or no interference with the air flow in the area. Typically the sensor is less than an inch long and 0.5 inch wide and less than 0.1 inch thick. Cable 18 may typically be a flat Teflon cable running as much as six feet or more in length and having a width of approximately 0.1 inch and a thickness of approximately 0.025 inch, although any cross-sectional shape may be used so long as it minimizes interference with the air flow in the area. Typically the cable has a cross-sectional area of less than 0.03 in$^2$. The flexibility of cable 18 is essential in permitting the probe to be installed easily, quickly, without special handling, drilling or adjustment of the equipment, and is an important feature of this invention. Cylindrical capsule 16 may be three inches or less in length and 0.5 inch or less in diameter; it need not be cylindrical. It should be located in line in the cable and remote from the sensor device in order to minimize any interference with air flow in the area of the sensor device.

Figure 2:
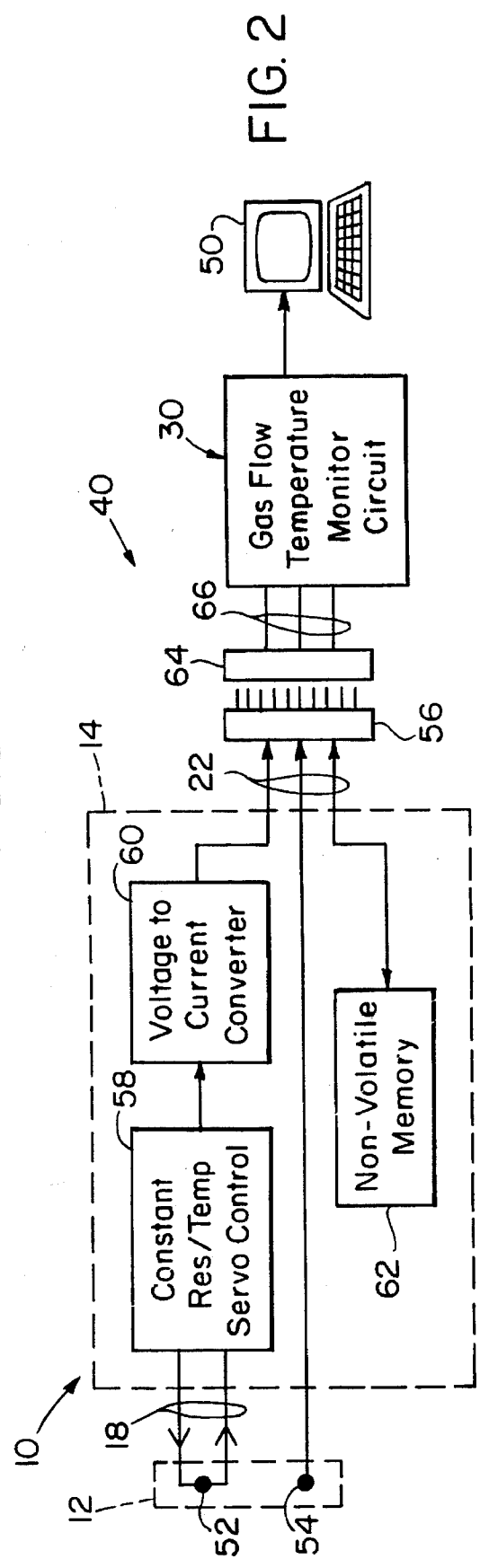
FIG. 2 is a more derailed schematic view of the sensor means and prenormalizer circuit of FIG. 1 connected to a computer through a gas flow and temperature monitor according to this invention.

Probe 10 is shown in greater detail in FIG. 2 interconnected with gas flow and temperature monitor circuit 30, which together constitute a multipoint gas flow and temperature sensing system 40. The output of gas flow and temperature monitor circuit 30 may be connected with a conventional computer 50 such as a PC. Sensing device 12 may include a thermistor 52 for sensing the cooling rate and a temperature sensor 54 for sensing the temperature of the air or other gas in the environment. The temperature signal sensed by sensor 54 is delivered over cable 18 to normalizer circuit 10 and from there over cable 22 to output connector 56. Gas flow and temperature monitoring circuit 30 is interconnected with the connector 56 from prenormalizer circuit 14 by means of complementary ten-pin connector 64 which may be connected through cable 66 or connected directly to gas flow and temperature monitor circuit 30. The cooling rate signal from thermistor 52 is delivered to a constant resistance/temperature servo control circuit 58 which provide the signal to voltage to current converter 60 that is in turn delivered over output cable 22 to output connector 56 which is typically a ten-pin connector. Stored in non-volatile memory 62 in prenormalizer circuit 14 is the gas (air) flow calibration data for this particular probe 10. The calibration data is obtained by initially operating probe 10 with sensor device 12 in three different known air flows and measuring the cooling rate voltage V and gas temperature T three times, and then using three simultaneous equations of the form $$\text{Gas(air)flow} = (V^2 - K_0 - (K_2 x - T)/K_1)^2 \quad (1)$$

By solving this equation three times for the three different known air flows, velocities and temperatures, the three calibration constants $K_0$, $K_1$ and $K_2$ can be determined for this particular probe. Then, in operation, with $K_0$, $K_1$ and $K_2$ known for this particular probe, the temperature T being obtained from sensor 54 and the cooling rate voltage V being obtained from thermistor 52, the actual airflow can be calculated by the gas flow and temperature monitor circuit 30.

Figure 3:
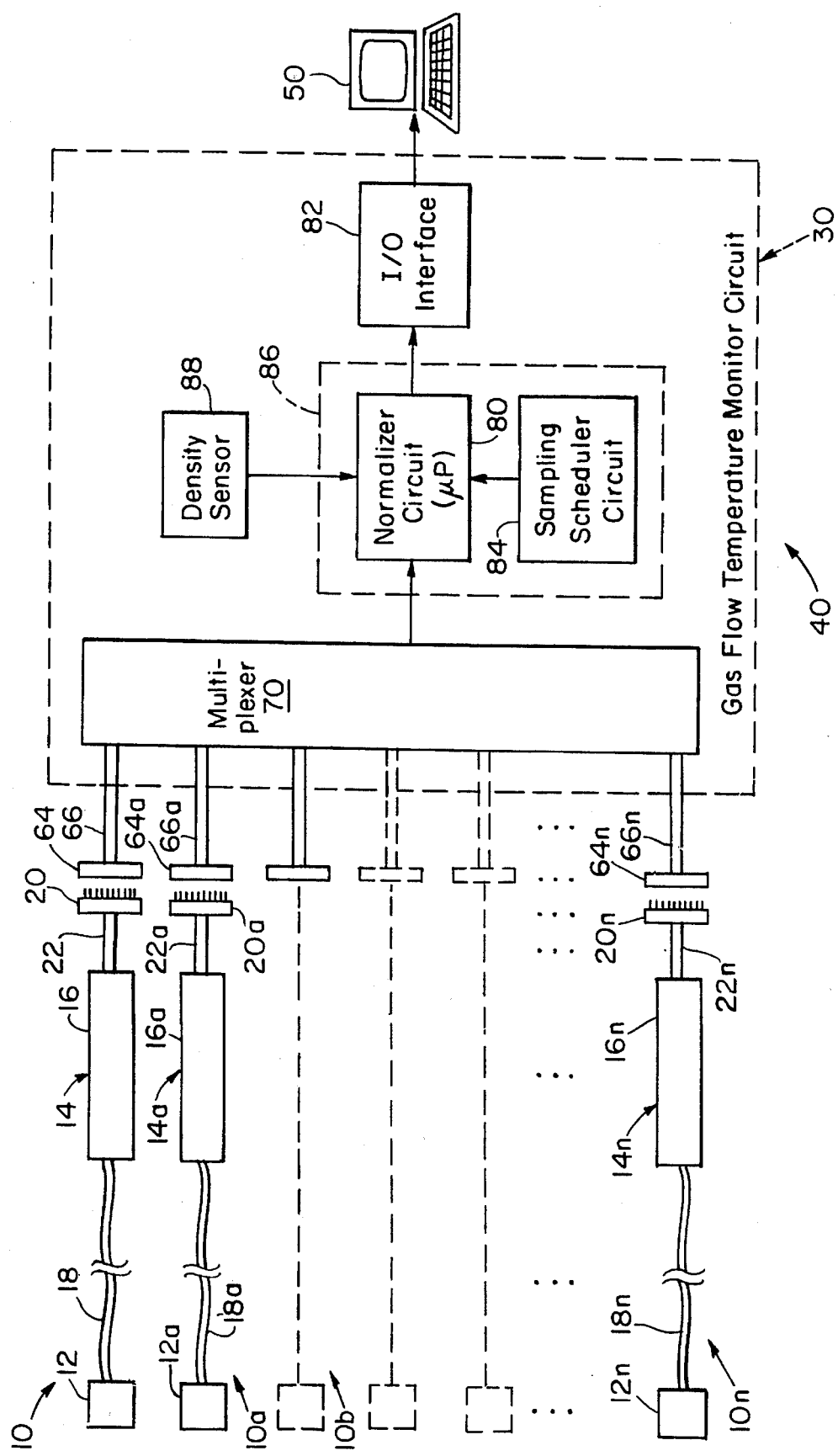
FIG. 3 is a schematic block diagram similar to FIG. 2 showing the gas flow and temperature monitor in greater detail.

Gas (air) flow and temperature system 40 according to this invention is shown in greater detail in FIG. 3, where the gas flow and temperature monitor circuit 30 is shown to include multiplexer 70 which has connected to it a plurality of probes 10, 10a, . . . 10n.

Normalizer circuit 80, which may utilize a conventional microprocessor, carries out the calculation for gas (air) flow as set forth in Equation (1) above utilizing the calibration data from memory 62 and the temperature signal from temperature sensor 54 and the cooling rate signal from thermistor 52 in FIG. 2. This output is provided through I/O interface 82 to, for example, conventional PC computer 50 which may be implemented by a conventional microprocessor program to carry out the calculation of gas (air) flow in accordance with Equation (1) above.

Sampling scheduler circuit 84 may be implemented in the same microprocessor as normalizer circuit 84 as indicated by the dashed lines 86.

A density sensor 88 for sensing the density of air or other gas being measured may be used to provide the ambient gas (air) density which is ratioed with the gas (air) density of the air or other gas at mean sea level and multiplied times the air flow from equation (1) above to obtain the linear air velocity in accordance with equation (2).

Linear Air Velocity=Air Flow (Density/Measured Density @MSL2)

Figure 7:
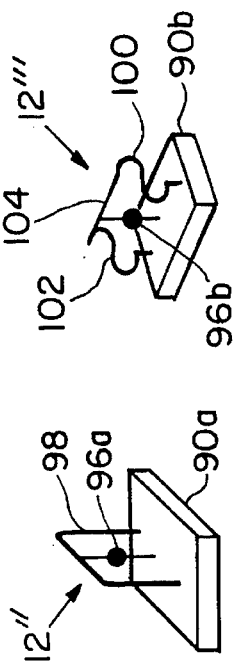
FIGS. 5, 6 and 7 are three-dimensional schematic views of alternative forms of the sensor device of FIG. 1.
Figures 5, 6:
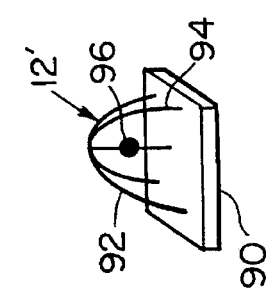
Figure 4:
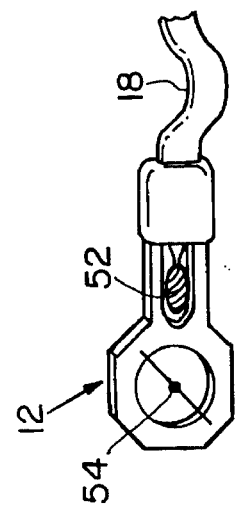
FIG. 4 is a schematic top plan view of the sensor device of FIGS. 1 and 2.

In one specific embodiment, sensor device 12, FIG. 4, may include thermistor 52 and temperature sensor 54 in a housing which is approximately 0.5 inch long as measured from left to right in FIG. 4, 0.2 inch wide as measured from top to bottom in FIG. 4, and approximately 0.03 inch thick as measured into the paper in FIG. 4. As indicated previously, it is not necessary to have two different sensor elements; a single element 12', FIG. 5, may be used and selectively switched to function alternately as a cooling rate detector and temperature sensor. And the physical form of the sensor device may vary as well. For example, sensor device 12', FIG. 5, is formed with a base 90 and crossed hoops 92 and 94 which actually support sensor element 96. In FIG. 6, base 90a supports a rectangular frame 98 that carries sensor element 96a, and in FIG. 7 base 90b supports a pair of S-shaped supports 100, 102 with a bridging element 104 that supports the sensor element 96b.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A multi-point gas flow and temperature sensing system comprising:

a gas flow temperature monitor;

a plurality of precalibrated gas flow temperature probes connectable to said gas flow temperature monitor, each said probe including:

sensor means for sensing the ambient gas cooling rate and temperature proximate said sensor means, an elongated flexible cable connected on one end to said sensor means for transmitting gas cooling rate and temperature signals from said sensor means, a prenormalizer circuit provided on each probe and connected on the other end of said cable, said prenormalizer circuit including means for storing the calibration constants for each probe relative to said gas cooling rate signal from said sensor;

means for transmitting said temperature signal, said gas cooling rate signal, and said calibration constants to said gas flow temperature monitor; said gas flow temperature monitor including a normalizer circuit for applying said calibration constants to said gas cooling rate signal for providing a normalized gas flow measurement.

2. The system of claim 1 in which said sensor means includes a thermistor for providing a voltage signal V representative of the gas cooling rate proximate the sensor means, and a temperature sensor for providing a temperature signal T representative of the temperature proximate the sensor means, said stored constants being an array of constants K; said normalizer circuit of said monitor including means for calculating the normalized gas flow GF proximate the sensor means by solving the equation GF= f(K, T, V).

3. The system of claim 2 in which said array of constant K includes $K_0$, $K_1$, and $K_2$; said equation being GF= $(V^2-K_0-(K_2 *T, /K_1)^2$.

4. The system of claim 1 in which said gas flow temperature monitor further includes a multiplexing circuit for real time sampling of said probes, and a scheduler circuit for defining the sampling rate of said multiplexing circuit.

5. The system of claim 4 in which said monitor further includes a gas density sensor and said normalizer circuit further includes means for calculating the linear gas velocity from said normalized gas flow and the gas density.

6. A precalibrated probe for a multi-point gas flow and temperature sensing system, said probe comprising:

sensor means for sensing the ambient gas cooling rate and temperature proximate the sensor means;

an elongated flexible cable connected on one end to said sensor means for transmitting gas cooling rate and temperature signals from said sensor means; and a prenormalizer circuit provided on the probe and connected on the other end of said cable and receptive to said gas cooling rate and temperature signals; said prenormalizer circuit including means for storing the calibration constants for the probe relative to said gas cooling rate signal from said sensor means; and means for connecting said prenormalizer circuit to a monitor and for transmitting said temperature signal, said gas cooling rate signal, and said calibration constants to the monitor.

* * * * *